United States Patent
Harmon et al.

(12) 
(10) Patent No.: US 6,558,646 B1
(45) Date of Patent: May 6, 2003

(54) METHOD FOR INCREASING THE LIFETIME OF STRETFORD SOLUTION

(75) Inventors: Marlea Harmon, Arroyo Grande, CA (US); Ronald C. Brinkman, Arroyo Grande, CA (US)

(73) Assignee: Tosco Corporation, Old Greenwich, CT (US)

(*) Notice: Subject to any disclaimer, the term of this patent is extended or adjusted under 35 U.S.C. 154(b) by 0 days.

(21) Appl. No.: 09/651,144

(22) Filed: Aug. 30, 2000

(51) Int. Cl.$^7$ .............................................. C01B 17/04
(52) U.S. Cl. ................. 423/573.1; 423/514; 423/576.4; 423/576.5; 423/576.6; 423/576.8
(58) Field of Search ........................... 423/573.1, 576.4, 423/576.5, 576.6, 576.7, 514

(56) References Cited

U.S. PATENT DOCUMENTS

| | | | |
|---|---|---|---|
| 3,965,243 A | 6/1976 | Krofchak | 423/226 |
| 3,972,989 A | 8/1976 | Fenton et al. | 423/573 G |
| 4,017,594 A | 4/1977 | Fenton et al. | 423/573 R |
| 4,083,945 A | 4/1978 | Fenton et al. | 423/573 R |
| 4,098,886 A | 7/1978 | Nicklin et al. | 423/226 |
| 4,260,590 A | 4/1981 | Weber | 423/226 |
| 4,283,379 A | 8/1981 | Fenton et al. | 423/571 |
| 4,325,936 A | 4/1982 | Gowdy et al. | 423/573 R |
| 4,360,508 A | 11/1982 | Farrington et al. | 423/544 |
| 4,364,918 A | 12/1982 | Espenscheld | 423/573 R |
| 4,367,212 A | 1/1983 | Castrantas | 423/573 R |
| 4,385,044 A | 5/1983 | Wolcott | 423/573 R |
| 4,432,962 A | 2/1984 | Gowdy et al. | 423/573 R |
| 5,380,442 A | 1/1985 | Yan | 210/721 |
| 4,526,773 A * | 7/1985 | Weber | 423/573 R |
| 4,541,998 A | 9/1985 | Weber | 423/226 |
| 4,892,723 A | 1/1990 | Delaney et al. | 423/573.1 |
| 4,921,682 A * | 5/1990 | De Haan et al. | 423/225 |
| 5,102,635 A | 4/1992 | Delaney et al. | 423/220 |

FOREIGN PATENT DOCUMENTS

| | | | | |
|---|---|---|---|---|
| DE | 2459897 A | * | 6/1975 | 423/576.6 |

OTHER PUBLICATIONS

Richard Randolph Garran; CXVII—The Ternary System Sodium Thiosulphate–Sodium Sulphate–Water; *J. Chem. Soc.*; 1926, pp. 848–855.
Abstract of the above–mentioned article appearing in *Chemical Abstracts*, vol. 20 p. 2444.

James L. Ludberg, Removal of Hydrogen Sulfide from Coke Oven Gas by the Stretford Process, Dominion Foundries and Steel LTD, Hamlin, Ontario, For Presentation at the 73$^{rd}$ Annual Meeting of the Air Pollution Control Association, Montreal Quebec, Jun. 22–27, 1980 pp. 1–16.

Eugene D. Becker et al., British Gas Stretford Desalting Process Update of Operations, Global Sulfur Systems Inc., Bakersfield, CA, Prepared for Presentation of GRI/Radian Liquid Redox Sulfur Recovery Conference, Austin, Texas, May 5–7, 1991, pp. 1–7.

Eugene Becker et al., Operation of the First British Gas Streford Desalting Unit, Global Sulfur Systems Inc., Bakersfield, CA, Prepared for Presentation at American Institute of Chemical Engineers, San Diego, CA, Aug., 1990, pp. 1–9.

Dr. D. E. Keene, British Gas Streford Process the Basis of Good Process Design and Operation, British Gas Research & Development Technology, Prepared for Presentation at Liquic Redox Sulfur Recovery Conference, Austin, TX, May 7–9, 1989, pp. 1–43.

Arthur Kohn and Richard nielson, eds., *Gas Purification*, Fifth Edition, 1997, Gulf Publishing Company, Liquid Phase Oxidation Processes for Hydrogen Sulfide Removal, Ch. 9, pp. 732–865 ISBN 0–88415–220–0.

T. Nicklin, B.H. Holland, Removal of Hydrogen Sulphide from Coke Oven Gas by the Streford Process, in Probleme Belim Bau Und Betrieb Von Kugelbehältern Für Flüssige Gas und Reinigung Von Kokereigas,Dechema–Monogr.Nr. 835–838, 1963, No. 48, pp. 243–271, Verlag Chemie, GMBH, Weinheim/Bergstrasse.

* cited by examiner

*Primary Examiner*—Stanley S. Silverman
*Assistant Examiner*—Timothy C. Vanoy
(74) *Attorney, Agent, or Firm*—Jeffrey R. Anderson

(57) ABSTRACT

A method is provided for increasing the lifetime of Stretford solution by reducing or eliminating the generation of undesirable thiosulfate salts. The method has three major aspects. First, thiocyanate is added to the Stretford solution. Second, the concentration of sodium sulfate in the solution is maintained at a level below about 100 g/l. Third, the solution should contain little or no thiosulfate at the start of operations. It has been found that little or no thiosulfate is generated when the Stretford unit is operated under these conditions. The concentration of sodium sulfate in the solution is maintained at a level below about 100 g/l by removing sodium sulfate from the solution by cooling a slipstream of the solution to precipitate the sodium sulfate as Glauber's salt.

19 Claims, 2 Drawing Sheets

METHOD FOR INCREASING THE LIFETIME OF STRETFORD SOLUTION

BACKGROUND OF THE INVENTION

1. Field of the Invention

This invention relates to a method for increasing the lifetime of Stretford solution, more particularly to a method of preventing the formation of thiosulfate in the Stretford solution.

2. Description of the Related Art

Hydrogen sulfide is a contaminant present in many gas streams. Due to environmental regulations, hydrogen sulfide must normally be removed from gas streams before they are discharged. The presence of hydrogen sulfide can also prevent the use of the gas stream in other processes, because the hydrogen sulfide can deactivate the catalysts in these processes. Many methods have been developed to remove hydrogen sulfide from gas streams.

The Stretford process is one method for removing hydrogen sulfide from gas streams prior to discharge. The Stretford process employs an alkaline aqueous washing solution containing a water-soluble salt of anthraquinone disulfonic acid (ADA) and a water soluble vanadium compound such as sodium vanadate ($NaVO_3$) to absorb the hydrogen sulfide from the gas stream and to oxidize the absorbed hydrogen sulfide to sulfur. The Stretford solution is regenerated by passing air through the solution.

The Stretford process is effective at substantially removing the hydrogen sulfide from gas streams, but maintaining of the Stretford solution significantly increases the operating costs. In particular, chemical reactions in solution result in a portion of the absorbed hydrogen sulfide and the product sulfur being converted to water-soluble sulfur-containing salts such as sulfates, thiosulfates, and polythionates. These salts increase the corrosivity of the washing solution, cause precipitation of components of the washing solution, and increase the rate of chemical consumption of the alkaline constituents of the washing solution. Eventually, the concentration of salts in the solution builds up to a level high enough that the salts must be removed from the solution or else it will not function properly to absorb hydrogen sulfide.

There are a number of methods for reducing the concentration of the sulfur-containing salts in Stretford solution. Some commercial plants periodically replace the entire washing solution and dispose the solution and the sulfur-containing salts. Other plants continuously bleed a slipstream of contaminated solution for disposal and add chemicals to replenish the chemicals in the circulating solution. Both disposal of the spent solution and the cost of the makeup chemicals greatly add to the cost of operating the Stretford plant.

There are a number of methods that have been developed to decrease the rate of buildup of salts in the solution and to prolong the life of the solution. The Unisulf process, described by Fenton et al. in U.S. Pat. No. 4,283,379, utilizes a washing solution comprising a soluble vanadium salt, a non-quinone aromatic compound, thiocyanate ions, and a water-soluble carboxylate complexing agent. The rate of formation of both sulfate and thiosulfate were greatly reduced compared to a conventional Stretford solution. Weber (U.S. Pat. No. 4,541,998) found that addition of thiocyanate to the washing solution suppressed the formation of thiosulfate. Although the lifetime of the solution is prolonged with these processes, sulfur-containing salts eventually build up in the solution, and the solution must be disposed.

Methods have also been developed to remove the salts from the Stretford solution. Farrington et al. (U.S. Pat. No. 4,360,508) describe a two stage method of desalting Stretford solution in which the solution is acidified with sulfuric acid to convert the sodium thiosulfate to sodium sulfate, sulfur dioxide, and sulfur through the following reactions:

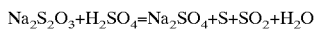

$Na_2S_2O_3 + H_2SO_4 = Na_2SO_4 + S + SO_2 + H_2O$

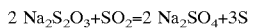

$2\ Na_2S_2O_3 + SO_2 = 2\ Na_2SO_4 + 3S$

Overall:

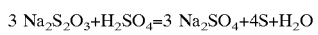

$3\ Na_2S_2O_3 + H_2SO_4 = 3\ Na_2SO_4 + 4S + H_2O$

The sodium sulfate is then removed from the solution by cooling, crystallizing the sodium sulfate as Glauber's salt. The crystallized Glauber's salt is separated from the solution by filtration, and the desalted Stretford solution is recycled to the Stretford unit.

Yan (U.S. Pat. No. 5,380,4420) describes a process in which the sodium thiosulfate is oxidized to sodium sulfate by catalytic oxidation. The sodium sulfate is removed by crystallization, and the desalted Stretford solution is reused.

Wolcott (U.S. Pat. No. 4,572,788) describes a method for treating spent Stretford solution in which a sidestream is taken from the solution, and ADA and vanadium are recovered from the sidestream by adsorbing the ADA onto charcoal and the vanadium onto an anion exchange resin. The ADA and the vanadium are recovered and are used to form new Stretford solution.

All of the methods of regenerating the Stretford solution are expensive and labor-intensive. There is a need for an improved and less expensive method of prolonging the lifetime of Stretford solution to reduce the cost of disposing or regenerating spent Stretford solution.

SUMMARY OF THE INVENTION

The present invention advantageously overcomes the shortcomings of the prior art by providing a process for prolonging the lifetime of Stretford solution by minimizing or eliminating the formation of thiosulfate salts in the Stretford solution.

In one aspect of the invention, there is provided a method for minimizing or eliminating the formation of thiosulfate salts in a washing solution for removing hydrogen sulfide from a gas stream by maintaining a concentration of sulfate salt in the solution at 100 grams/liter or less for an extended period of time. The concentration of sulfate salt is calculated on the basis of anhydrous sodium sulfate.

Preferably the extended period of time is at least as long as the length of time that would be required for the concentration of sulfate salt in the washing solution to reach 120 grams/liter, if sulfate salts are not removed from the solution.

In some embodiments, the method includes having thiocyanate ion in the Stretford solution. Preferably, the method also includes having a Stretford solution with less than about 5 grams/liter of thiosulfate ion. In a preferred embodiment, the Stretford solution contains between about 10 and 30 grams/liter thiocyanate ion. Advantageously, the sulfate salt is removed from the washing solution by cooling the solution.

In another aspect of the invention, there is provided a method for removing hydrogen sulfide from a hydrogen sulfide containing gas stream and converting the hydrogen sulfide to sulfur while forming substantially no thiosulfate.

The method includes contacting the gas stream with a washing solution to absorb the hydrogen sulfide in the washing solution, allowing the washing solution to convert the hydrogen sulfide to sulfur, oxidatively regenerating the washing solution, recycling the regenerated washing solution into contact with the gas stream, and maintaining a concentration of 100 grams/liter or less sodium sulfate in the washing solution for an extended period of time.

Advantageously, the washing solution contains thiocyanate ion. Preferably, the washing solution contains less than about 5 grams/liter thiosulfate ion.

In yet another aspect of the invention, there is provided a method for minimizing or eliminating the formation of thiosulfate salts in Stretford solution. The method includes maintaining a concentration of less than 100 grams/liter sulfate salt in the Stretford solution for an extended period of time, where the concentration of sulfate salt is calculated on the basis of anhydrous sodium sulfate. Preferably, the Stretford solution contains at least about 15 grams/liter thiocyanate ion. Advantageously, the Stretford solution contains less than about 5 grams/liter thiosulfate ion.

In another aspect of the invention, there is provided a method for removing hydrogen sulfide from a gas stream and converting the hydrogen sulfide to sulfur while forming substantially no thiosulfate. The method includes contacting the gas stream with a washing solution having a pH between about 5 and 10. The washing solution contains a salt of anthraquinone disulfonic acid, water-soluble vanadium, and thiocyanate ion. The hydrogen sulfide is absorbed by the washing solution and is converted to sulfur by the washing solution. The washing solution is oxidatively regenerated and is recycled into contact with the gas stream. The method includes maintaining a concentration of sulfate salt in the washing solution at 100 grams/liter or less for an extended period of time, where the concentration of sulfate salt is calculated on the basis of anhydrous sodium sulfate. Preferably, there is less than about 5 grams/liter thiosulfate in the washing solution.

DETAILED DESCRIPTION OF THE PREFERRED EMBODIMENTS

Stretford solution is used to remove hydrogen sulfide from a wide variety of hydrogen sulfide-containing gas streams, including gas streams generated as a result of petroleum refining, sweetening of sour natural gas, formation of synthetic fuels from coal or oil shale, use of geothermal fluids to generate electricity, or any other processes which produce hydrogen sulfide-containing gas. The sulfur-containing salts which build up in the Stretford solution must be removed by disposing or desalting the solution. Disposing or desalting the solution are significant costs in operating the Stretford plant.

The method of the present invention significantly increases the lifetime of Stretford solution by reducing the rate of buildup of the water-soluble sulfur-containing salts, reducing the cost of operating Stretford plants. In particular, the rate of buildup of thiosulfate salts in the solution is reduced or eliminated with the embodiments of the method of the present invention.

Although the method of the invention is described with the example of Stretford solution, it is to be understood that the method may be applicable to other hydrogen sulfide washing solutions including other vanadium-based scrubbing solutions as well as iron-based scrubbing solutions such as Takahax, Hiperion, or the SULFEROX Process, as are known to those skilled in the art.

Figure 1:
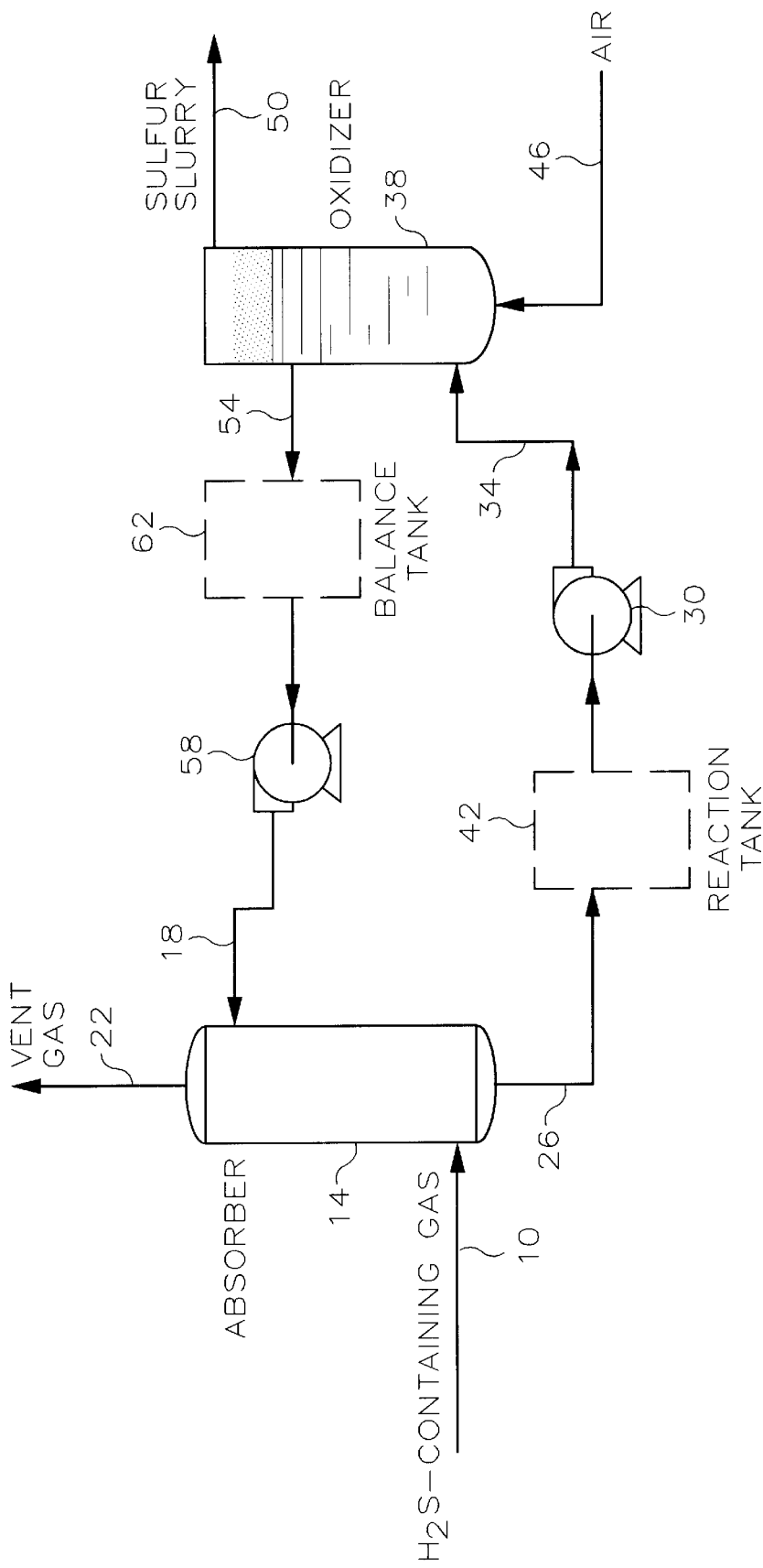
FIG. 1 is a schematic flow diagram showing the manner in which a hydrogen sulfide gas is treated in a typical Stretford unit.

FIG. 1 schematically illustrates the process equipment employed in a typical Stretford plant. Further information on the Stretford process is available, for example, in Chapter 9 of Gas Purification, $5^{th}$ Edition, (1997), by Richard B. Nielsen and "British Gas Stretford Process-The Basis of Good Process Design and Operation" by Dr. D. E. Keene, presented at Liquid Redox Sulphur Recovery Conference, Austin, May 7–9, 1989, the entirety of each of which is incorporated herein by reference. Referring to FIG. 1, hydrogen sulfide-containing gas is introduced through conduit 10 into the bottom of absorber 14. A washing solution is introduced into the top of the absorber 14 through conduit 18. The washing solution flows downward in the absorber 14 countercurrent to the flow of the hydrogen sulfide-containing gas. In normal operation, the washing solution (i.e., Stretford solution) absorbs essentially all of the hydrogen sulfide from the hydrogen sulfide-containing gas, forming a vent gas which is substantially free of hydrogen sulfide. The vent gas is discharged through conduit 22 into the atmosphere.

After the hydrogen sulfide has been absorbed by the Stretford washing solution, the hydrogen sulfide is oxidatively converted to elemental sulfur by the constituents of the washing solution. The reduced washing solution and entrained elemental sulfur are withdrawn from the absorber 14 through conduit 26. The reduced Stretford solution and the entrained sulfur are pumped by pump 30 through conduit 34 into the bottom section of oxidizer 38. In some Stretford units, there is no pump 30. Because the oxidation of the absorbed hydrogen sulfide to elemental sulfur takes approximately 10–15 minutes, a reaction tank 42 is optionally placed between the absorber 14 and the oxidizer 38 to allow for additional time for the constituents of the washing solution to oxidize the absorbed hydrogen sulfide to sulfur.

The reduced washing solution and the entrained sulfur in the oxidizer 38 are contacted with air introduced into the bottom of the oxidizer 38 through air conduit 46.

The reduced washing solution is oxidized by the air, regenerating the solution. The air which is introduced into the bottom of the oxidizer 38 also helps to float the sulfur particles to the top of the oxidizer 38, forming a sulfur slurry. The sulfur slurry is withdrawn from the oxidizer 38 through sulfur conduit 50 at the top of the oxidizer 38.

The sulfur is separated from the sulfur slurry with a filter, a centrifuge or other device capable of separating the particulate sulfur from the washing solution which is contained in the sulfur slurry. The particulate sulfur product is relatively pure and is generally suitable for agricultural use.

The regenerated washing solution is withdrawn from the oxidizer 38 through exit conduit 54 and is recycled to the top of the absorber 14 through conduit 18 by recycle pump 58. An optional balance tank 62 may serve as a surge tank for the Stretford solution which is recycled back into the top of the absorber 14.

The Stretford washing solution can have a variety of compositions, as is known to those of skill in the art. A typical Stretford solution is an aqueous solution which has a pH between 5 and 10, preferably a pH above 7, more preferably a pH between about 8.5 and 9.5. It is preferred, but not essential, that the pH be below about 8.8, because it is known that the formation of thiosulfate increases significantly at a pH above 8.8 (see Gas Purification, page 780). The pH of the solution may be adjusted by the addition of alkalis such as caustic soda, caustic potash, ammonia, carbonate salts, bicarbonate salts, or organic bases such as alkanolamines. The preferred alkalis are sodium carbonate or bicarbonate. Sodium carbonate is an exemplary alkali. Mixtures of sodium carbonate and bicarbonate may also be used, such as a mixture of about 1–8 g/l of sodium carbonate and about 10–30 g/l of sodium bicarbonate.

Stretford solutions also typically contain anthraquinone disulfonate (ADA), usually as the disodium salt. ADA has a variety of isomers substituted at the 1,4; 1,8; 1,6; 1,7; 2,6; and 2,7 positions, as is known to those of skill in the art. The 2,6 and the 2,7 isomers are the most active isomers. In general, the 2,7 isomer is the preferred isomer, because the 2,7 isomer is the most soluble in water. The concentration of ADA in the Stretford solution, calculated on the basis of the disodium salt, can be as high as 6 g/l. The concentration of ADA in the solution is more preferably between about 0.5 and 4 g/L, and most preferably between about 0.5 and 2 g/L.

Stretford solution also contains vanadium in a water-soluble form, such as alkali metal or ammonium vanadate, including sodium metavanadate, sodium orthovanadate, sodium pyrovanadate, sodium ammonium vanadate or isopolyvanadate, or ammonium vanadate. Sodium metavanadate is an exemplary form of water-soluble vanadium. The concentration of vanadium in the Stretford solution, calculated as the metal, is between about 0.3 and 20 grams/liter, more preferably between about 0.5 and about 10 g/l, and most preferably between about 1 and about 4 g/l.

A carboxylate complexing agent may optionally be added to the washing solution to maintain the solubility of vanadium in the presence of thiocyanate ions. The complexing agent typically contains at least two water-solubilizing agents, at least one of which is a carboxyl group. Preferably, the complexing agent contains at least one carboxyl group and at least one hydroxy group. Suitable carboxylate complexing agents include the water-soluble polycarboxylic acids and their salts, such as maleic acid, particularly those polycarboxylic acids and salts having at least one hydroxy group, such as citric acid, malic acid and/or tartaric acid, and the monohydoxy- or polyhydroxy monocarboxylic acids and their salts, such as glycolic acid. Citric acid and its water-soluble salts are particularly preferred carboxylic complexing agents.

The carboxylate complexing agent is an optional constituent of the washing solution, and the embodiments of the method of the invention do not depend on the presence of the carboxylate complexing agent.

The chemistry that occurs during the Stretford process is complex. Although the following equations are written for the sodium salts, it is to be understood that other salts may also be used in Stretford solution. It is believed that the Stretford solution absorbs the hydrogen sulfide in the gas stream by forming sodium hydrosulfide through the following reaction:

$$H_2S+Na_2CO_3=NaHS+NaHCO_3. \quad (1)$$

The hydrosulfide is oxidized to elemental sulfur by the vanadium:

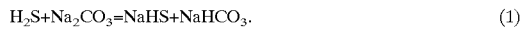
$$2NaHS+4\ NaVO_3+H_2O=Na_2V_4O_9+2S+4\ NaOH \quad (2)$$

The vanadium is then oxidized by the ADA.

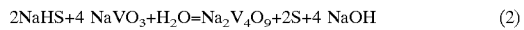
$$Na_2V_4O_9+2NaOH+H_2O+2ADA=4\ NaVO_3+2ADA\ (reduced) \quad (3)$$

Reaction (1) occurs in the absorber 14. Reaction (2) starts in the absorber 14, and may continue in the optional reaction tank 42, if more time is required. Reaction (2) typically takes about 10 to 15 minutes. Reaction (3) takes place in the oxidizer 38.

The reduced ADA is oxidized with air in the oxidizer 38.

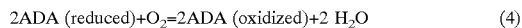
$$2ADA\ (reduced)+O_2=2ADA\ (oxidized)+2\ H_2O \quad (4)$$

Thiosulfate and sulfate build up in the Stretford solution as by-products. Although the details of the reactions which form thiosulfate are not completely understood, it is believed that small amounts of the hydrosulfide and dissolved polysulfides (formed from suspended sulfur) are oxidized to form thiosulfate through the following reactions:

$$2\ NaHS+2\ O_2=Na_2S_2O_3+H_2O \quad (5)$$

$$Na_2S_4+O_2+NaOH=Na_2S_2O_3+NaHS \quad (6)$$

Thiosulfate can be formed in the absorber 14 by oxidation of the hydrosulfide with dissolved oxygen. In addition, any residual hydrosulfide in the solution entering the oxidizer 38 is also converted to thiosulfate. Disproportionation of the precipitated sulfur can also lead to thiosulfate formation:

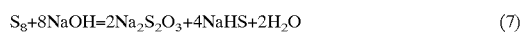
$$S_8+8NaOH=2Na_2S_2O_3+4NaHS+2H_2O \quad (7)$$

Sulfate ($Na_2SO_4$) is an alternative byproduct formed by oxidation of the thiosulfate. The sulfate and thiosulfate build up in the solution and must eventually be removed. The most common prior art methods of removing the salts are disposing the solution and desalting.

In the desalting process, the Stretford solution is acidified to decompose the sodium thiosulfate, as described in the background section. The sodium sulfate is then removed by cooling and crystallizing. The desalted Stretford solution can be recycled back to the Stretford unit. The basic patent on desalting is Farrington et al. (U.S. Pat. No. 4,360,508).

The embodiments of the method of the present invention provide a means for minimizing or essentially eliminating the formation of thiosulfate salts. The method has three aspects, each of which contributes to minimizing the formation of thiosulfate salts. Although some embodiments of the method of the present invention do not implement all three of the aspects of the method of the invention, in an exemplary embodiment, all three aspects of the method of the invention are put into practice.

First, it has been found that including thiocyanate in the washing solution suppresses formation of thiosulfate. Second, it has been found that maintaining the concentration of sodium sulfate in the washing solution at a level of about 70–100 grams/liter or less essentially eliminates thiosulfate formation. Third, it has been found that if significant amounts of thiosulfate are present in the washing solution, more thiosulfate forms. It is therefore important to provide a washing solution which contains little or no thiosulfate.

In alternative embodiments, only one or two of the three aspects of the method of the invention are put into practice. For example, one embodiment of the method involves maintaining the concentration of sodium sulfate in the washing solution at a level of 100 g/l or less without implementing the other two aspects of the method of the invention. Each of the three aspects will be described in more detail.

Formation of thiosulfate is suppressed when thiocyanate ($SCN^-$) is included in the washing solution. The thiocyanate can be added as a salt, such as alkali metal or ammonium thiocyanate. Alternatively, compounds which are capable of forming thiocyanate can be added to the solution, for example, alkali metal or ammonium cyanide. Cyanide ion is converted to thiocyanate through a reaction with absorbed hydrogen sulfide. At least for the initial formulation of the washing solution, it is generally preferred that an alkali metal or ammonium thiocyanate be dissolved in the washing solution to provide the thiocyanate ions. Calculated as grams of thiocyanate ions ($SCN^-$) per liter of solution, the washing solution contains between about 5 and about 100 grams of thiocyanate ion per liter of solution, more preferably between about 10 and about 30 grams of thiocyanate ion per liter of solution, and most preferably between about 15 and about 25 grams of thiocyanate ion per liter of solution. In an exemplary embodiment, there are approximately 25 grams of thiocyanate per liter of solution in the solution when the Stretford unit is started, and the concentration of thiocyanate ion is maintained at a concentration of approximately 15 to 20 grams per liter during operation.

Formation of thiosulfate can be suppressed or eliminated for extended periods of time by maintaining the concentration of sodium sulfate in the washing solution at a concentration of approximately 100 grams/liter or less, more preferably approximately 70 grams/liter or less, and most preferably approximately 55 grams/liter or less. The concentration of sodium sulfate is calculated on the basis of anhydrous sodium sulfate ($Na_2SO_4$).

In order to maintain the concentration of sodium sulfate at the desired levels, sodium sulfate is removed from the washing solution, either periodically, continuously, or semicontinuously. The sodium sulfate may be removed from the solution in any manner known to those of skill in the art. Cooling the washing solution to crystallize the sodium sulfate from the washing solution is an exemplary method of removing the sodium sulfate. The sodium sulfate crystallizes from the washing solution in the form of Glauber's salt, sodium sulfate decahydrate ($Na_2SO_4.10\ H_2O$). Cooling a slipstream of the washing solution to precipitate Glauber's salt from the washing solution on a continuous or semicontinuous basis is an exemplary means of maintaining the concentration of sodium sulfate in the washing solution at controlled levels in the 50–100 g/l range.

In another exemplary embodiment, the sodium sulfate is crystallized from the entire solution, reducing the concentration of sodium sulfate to a level of approximately 30 g/l. This embodiment is appropriate, for example, when the Stretford unit has been shut down for a turnaround. In this embodiment, the entire solution is pumped from the Stretford unit though the crystallizer and into a separate tank. After the entire solution has been desalted, the desalted Stretford solution is pumped from the separate tank back into the Stretford unit. Desalting the entire solution produces a solution with lower levels of sodium sulfate than a solution which has been desalted by desalting a slipstream.

The solubility of the sodium sulfate in the washing solution decreases with decreasing temperature. It is therefore generally preferable to cool the washing solution to the lowest possible temperature in order to remove as much of the sodium sulfate from the solution as possible. The temperature to which the washing solution may be cooled is limited by the freezing point of the solution. For example, the freezing point of an aqueous solution containing 100 g/l of sodium sulfate is 29° F. The freezing point of an aqueous solution containing 50 g/l of sodium sulfate is 30° F. The practical temperature limit for cooling the solution is therefore approximately 350° F., although the temperature may be slightly lower but above the freezing temperature.

The crystallized sodium sulfate can be separated from the washing solution in any suitable manner such as centrifugation, filtration, settling, or any other suitable method. Filtering the washing solution with a belt filter is an exemplary method of separating the crystallized sodium sulfate.

Figure 2:
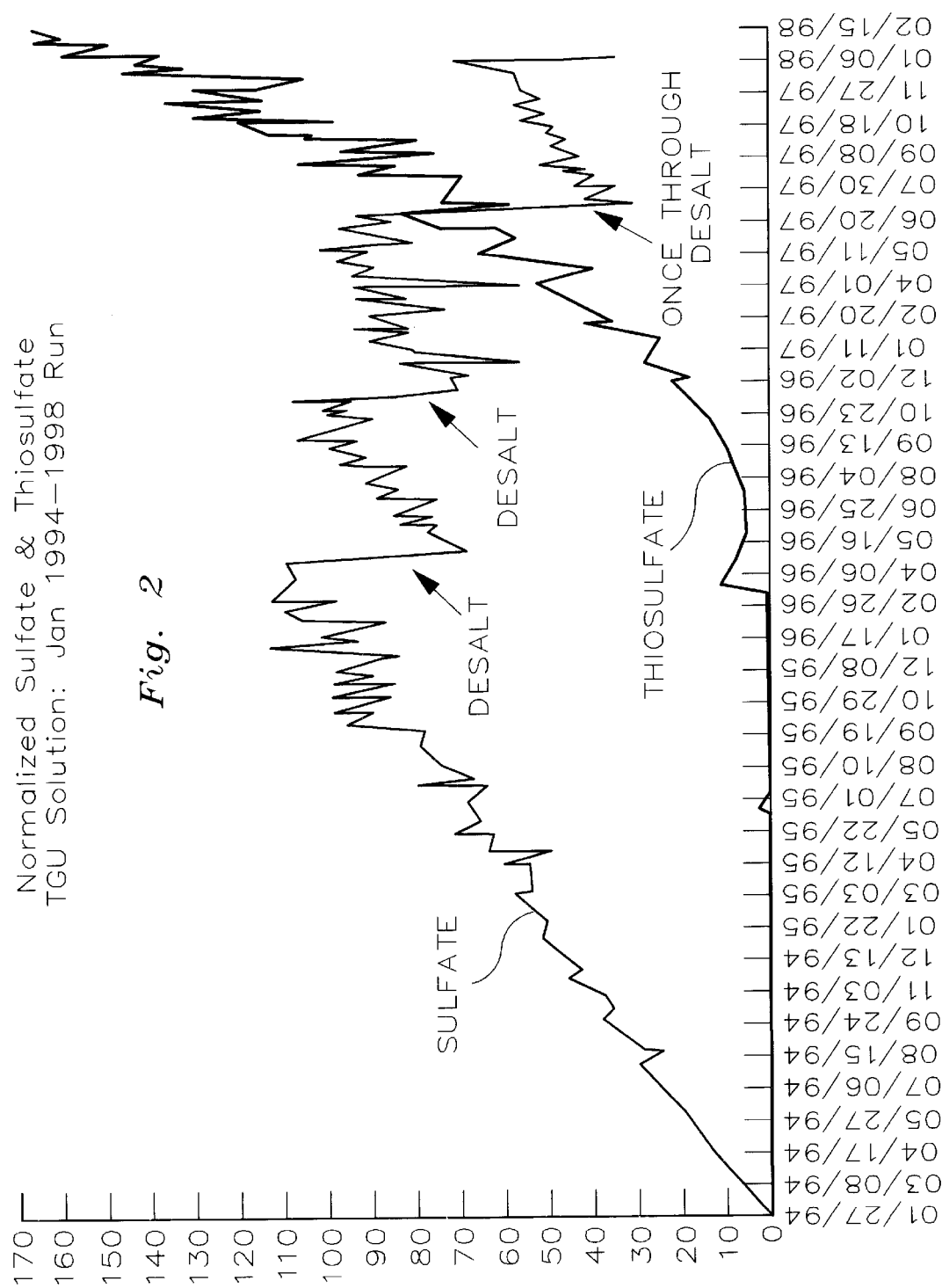
FIG. 2 is a graph showing the concentrations of sodium sulfate and sodium thiosulfate versus time in a Stretford unit.

FIG. 2 shows a graph of the concentrations of sodium sulfate and thiosulfate as a function of time in a Stretford unit operated over a four year period. The Stretford solution contained approximately 15 g/l of thiocyanate ion, in accordance with the first aspect of the method of the present invention. As can be seen from the data in the graph, there was essentially no thiosulfate buildup in the solution up to about Apr. 6, 1996. The presence of the thiocyanate ion in the solution is believed to be an important factor in inhibiting thiosulfate formation.

The concentration of sodium sulfate increased at an approximately linear rate until about Mar. 25, 1996, when the sodium sulfate concentration reached almost 120 g/l, calculated on the basis of anhydrous sodium sulfate. Thiosulfate started to form in the solution at about this time. The solution was desalted on about May 16, 1996, lowering the sodium sulfate level to about 70 g/l. Desalting involved cooling the solution to crystallize Glauber's salt from the solution and filtering the crystallized sodium sulfate. The solution was not acidified to decompose thiosulfate, as in the normal desalting process.

Although the rate of thiosulfate formation appeared to initially decrease after desalting, the rate of thiosulfate generation started to increase starting on about Oct. 23, 1996, The solution was desalted two more times, first on about Dec. 02, 1996 and again on about Jul. 30, 1997. The rate of thiosulfate formation did not decrease with the two later desaltings. In fact, the rate of thiosulfate formation increased with time.

The data in the graph of FIG. 2 are consistent with the second and third aspects of the method of the invention. Thiosulfate did not start to form in the solution until the sodium sulfate concentration reached about 120 g/l. The second aspect of the method of the invention involves maintaining the concentration of sodium sulfate in the washing solution at a level of 70–100 g/l or less to minimize or eliminate thiosulfate formation. It has been found that thiosulfate formation is minimized or eliminated if the sulfate concentration is maintained below about 70–100 g/l.

Once thiosulfate started to form, thiosulfate continued to form in spite of desalting, consistent with the third aspect of the method. The concentration of sodium sulfate was about 70 g/l after the first two desalting operations and as low as 30 g/l after the third desalting, well below the 70–100 g/l of sodium sulfate of the second aspect of the method of the present invention. In spite of the low concentrations of sodium sulfate in the washing solution after the second and third desalting operations, thiosulfate continued to form in the solution. The formation of thiosulfate is believed to be autocatalytic. Once thiosulfate is present in the solution, generation of more thiosulfate appears to be irreversible, at least when the concentration of thiosulfate is greater than about 5–10 g/l, based on the data in FIG. 2. Thiosulfate continues to form in the washing solution in spite of the presence of thiocyanate ion in the solution. Having a washing solution with thiocyanate ion is therefore not sufficient in itself to eliminate the generation of thiosulfate. The second two aspects of the method of the invention are important in eliminating the formation of thiosulfate.

Because the sodium thiosulfate is very soluble in water, about 250 g/l at 35° F., the sodium thiosulfate cannot be effectively separated from the washing solution by desalting through cooling and crystallization. Providing a washing solution with low levels of thiosulfate is therefore an important aspect of the method of the invention.

The washing solution preferably contains less than about 5 g/l of thiosulfate ion, more preferably less than about 1 g/l, and most preferably a nondetectable level of thiosulfate ion.

Although one could, in principle, convert the sodium thiosulfate to sodium sulfate by acidifying the washing solution, the preferred washing solution of the method of the present invention contains thiocyanate to minimize the formation of thiosulfate. If the washing solution containing thiocyanate were to be acidified to convert the thiosulfate to sulfate, the thiocyanate could be converted to hydrogen cyanide on acidification, presenting what many would consider to be an unacceptable health risk to the workers.

An exemplary embodiment of the method of the present invention includes all three aspects of the method: (1) including thiocyanate ion in the washing solution; (2) maintaining the concentration of sodium sulfate in the solution below about 70–100 g/l; and (3) providing a washing solution with little or no thiosulfate. Preferably, all three aspects of the method of the invention are practiced.

Fresh Stretford solution contains little or no sodium sulfate. It is to be understood that the second aspect of the method of the present invention, maintaining the concentration of sodium sulfate in the washing solution below about 70 or 100 g/l to minimize thiosulfate formation, is for a washing solution which has been in operation for an extended period of time, not for a fresh Stretford solution, where little or no sodium sulfate is normally present.

The rate of formation of sulfate and thiosulfate in hydrogen sulfide washing solutions such as Stretford solution is dependent on the operating conditions of Stretford unit, the characteristics of the hydrogen sulfide-containing gas stream, the skill of the operating personnel, and a large number of other factors. The length of time required for the unit to be considered in operation for an extended period of time is therefore not a fixed number but is highly dependent on operating conditions.

As can be seen from the data in FIG. 2, the increase in concentration of sodium sulfate in the washing solution was roughly linear. Once the concentration of sodium sulfate built up to about 120 g/l, thiosulfate started to form irreversibly, and desalting was not effective in eliminating the thiosulfate formation. For the purposes of the present invention, and extended period is therefore understood to be the length of time that the sodium sulfate in the solution, calculated on the basis of anhydrous sodium sulfate $Na_2SO_4$, would be extrapolated to reach about 120 g/l without desalting or otherwise removing sodium sulfate from the solution.

It took approximately 26 months for the sodium sulfate concentration in the Stretford unit of FIG. 2 to reach approximately 120 g/l. In this particular Stretford unit, under these particular operating conditions, an extended period of time was approximately 26 months. In the context of the embodiments of the method of the present invention, an extended period of time may be a longer or shorter period of time, depending on the how the unit is operated. One of ordinary skill in the art would be able to determine what an extended period of time is for a particular Stretford unit, based on data such as shown in FIG. 2.

Commercial Operation of the Method

A Stretford solution for a commercial Stretford unit having a 160,000 gallon capacity and producing 4 tons/day of sulfur was formulated with about 25 g/l of thiocyanate ion, 2 g/l of sodium ammonium vanadate, and 18–20 mg/l total alkalinity. No carboxylate complexing agent was present in the solution. During operation of the unit, a slipstream of the solution was intermittently passed through a chiller cooled to about 35° F. to crystallize Glauber's salt from the solution, maintaining the concentration of sodium sulfate in the solution at a concentration of less than 70–100 g/l. The Glauber's salt was separated from the solution with a belt filter, and the desalted slipstream of Stretford solution was returned to the Stretford unit. The filtered sodium sulfate was dissolved in water from cooling tower blowdown, and the resulting sodium sulfate solution was disposed in the wastewater treatment system.

After almost one year of operation, no significant amounts of thiosulfate had formed in the Stretford solution. Eliminating thiosulfate formation in the Stretford solution has significantly reduced the operating costs by eliminating the cost of disposing spent Stretford solution. Preferably, thiosulfate will be kept from forming for a period of at least two years, more preferably three years, and optimally five years or more. Time periods of as long or longer than this may be achieved by practicing the present invention.

Generation of thiosulfate in a hydrogen sulfide washing solution can therefore be reduced or eliminated by: (1) including thiocyanate ion in the washing solution; (2) maintaining the concentration of sodium sulfate in the solution at a concentration of less than about 70–100 g/l, based on anhydrous sodium sulfate; and(3) having a washing solution which contains little or no thiosulfate.

Various modifications and alterations of this invention will be apparent to those skilled in the art without departing from the scope and spirit of this invention. It should be understood that the invention is not limited to the embodiments disclosed therein, and that the claims should be interpreted as broadly as the prior art allows.

What is claimed is:

1. A method for minimizing or eliminating the formation of thiosulfate salts in a washing solution for removing hydrogen sulfide from a gas stream, said method comprising maintaining a concentration of sulfate salt in said washing solution at 100 grams/liter or less, wherein said concentration of sulfate salt is calculated on the basis of anhydrous sodium sulfate; and wherein said washing solution comprises thiocyanate ion; and wherein said maintaining comprises removing sulfate salt from said washing solution without acidifying said washing solution prior to removing said sulfate salt from said washing solution.

2. The method of claim 1, wherein said washing solution comprises a aqueous solution having a pH between 5 and 10, a water soluble vanadium salt, and a salt of anthraquinonedisulfonic acid.

3. The method of claim 2, wherein said washing solution comprises a carbonate salt.

4. The method of claim 2, wherein said washing solution has a pH between 8.5 and 9.5.

5. The method of claim 4, wherein said sulfate salt comprises sodium sulfate.

6. The method of claim 4, wherein said sulfate salt is removed from said washing solution by cooling said washing solution to crystallize said sulfate salt.

7. The method of claim 6, wherein said sulfate salt is removed from a slipstream of said washing solution.

8. The method of claim 7, wherein said sulfate salt is removed from said washing solution continuously or semi-continuously.

9. The method of claim 1 wherein said washing solution comprises approximately 10 to approximately 30 grams/liter thiocyanate ion.

10. The method of claim 1, wherein said washing solution comprises less than approximately 5 grams/liter thiosulfate ion.

11. A method for removing hydrogen sulfide from a hydrogen sulfide containing gas stream and converting said hydrogen sulfide to sulfur while forming substantially no thiosulfate, said method comprising:
   (a) contacting said hydrogen sulfide-containing gas stream with a washing solution so as to absorb said hydrogen sulfide into said washing solution; wherein said washing solution further comprises thiocyanate ion;
   (b) allowing the absorbed hydrogen sulfide to react with constituents of said washing solution so as to convert said hydrogen sulfide substantially completely into elemental sulfur;
   (c) oxidatively regenerating the washing solution from step (b) so as to form a regenerated washing solution;
   (d) recycling the regenerated washing solution from step (c) into contact with said hydrogen sulfide-containing gas stream; and
   (e) maintaining a concentration of sulfate salt in said washing solution at 100 grams/liter or less, wherein said concentration is calculated on the basis of anhydrous sodium sulfate; and wherein said washing solution comprises thiocyanate ion; and wherein said maintaining comprises removing sulfate salt from said washing solution without acidifying said washing solution prior to removing said sulfide from said washing solution.

12. The method of claim 11, wherein said washing solution comprises a water-soluble vanadium salt, a salt of anthraquinonedisulfonic acid, and a base.

13. The method of claim 11, wherein said washing solution comprises less than approximately 5 grams/liter thiosulfate ion.

14. The method of claim 11, wherein said washing solution has a pH between 8.5 and 9.5.

15. A method for minimizing or eliminating the formation of thiosulfate salts in Stretford solution, said method comprising maintaining a concentration of less than 100 grams/liter sulfate salt in said Stretford solution, wherein said concentration of sulfate salt is calculated on the basis of anhydrous sodium sulfate; wherein said Stretford solution comprises as least approximately 15 grams/liter thiocyanate ion; and wherein said maintaining comprises crystallizing said sulfate salt from said Stretford solution without acidifying said Stretford solution prior to crystallizing said sulfate salt from said Stretford solution.

16. The method of claim 15, wherein said Stretford solution comprises less than approximately 5 grams/liter thiosulfate ion.

17. A method for removing hydrogen sulfide from a hydrogen sulfide containing gas stream and converting said hydrogen sulfide to sulfur while forming substantially no thiosulfate, said method comprising:
   (a) contacting said hydrogen sulfide-containing gas stream with a washing solution so as to absorb said hydrogen sulfide into said washing solution, said washing solution comprising an aqueous solution having a pH between about 5 and 10, a salt of anthraquinone disulfonic acid, water-soluble vanadium, and thiocyanate ion;
   (b) allowing the absorbed hydrogen sulfide to react with constituents of said washing solution so as to convert said hydrogen sulfide substantially completely into elemental sulfur, (c) oxidatively regenerating the washing solution from step (b) so as to form a regenerated washing solution;
   (d) recycling the regenerated washing solution from step (c) into contact with said hydrogen sulfide-containing gas stream; and
   (e) maintaining a concentration of sulfate salt in said washing solution at 100 grams/liter or less, wherein said concentration is calculated on the basis of anhydrous sodium sulfate; and wherein said maintaining comprises removing sulfate salt from said washing solution without acidifying said washing solution prior to removing said sulfate salt from said washing solution.

18. The method of claim 17, wherein said washing solution comprises between about 10 and about 30 grams/liter of thiocyanate ion, between about 0.5 and about 10 grams/liter of vanadium, and between about 1 and 4 grams/liter of said salt of anthraquinone disulfonic acid.

19. The method of claim 17, wherein said washing solution comprises less than approximately 5 grams/liter thiosulfate ion.

* * * * *